United States Patent [19]

Smith et al.

[11] Patent Number: 5,125,716
[45] Date of Patent: Jun. 30, 1992

[54] VEHICLE CAB DOOR CONSTRUCTION

[75] Inventors: Richard J. Smith, Dubuque, Iowa;
Gary W. Tindall, Hazel Green, Wis.;
Edward H. Kiefer, Dubuque, Iowa

[73] Assignee: Deere & Company, Moline, Ill.

[21] Appl. No.: 638,310

[22] Filed: Jan. 4, 1991

[51] Int. Cl.$^5$ ............................................. B60J 5/02
[52] U.S. Cl. ................................. 296/190; 296/201;
296/202; 296/146 R; 296/901; 49/501
[58] Field of Search ............... 296/146, 190, 201, 202,
296/901; 49/501

[56] References Cited

U.S. PATENT DOCUMENTS

| | | | |
|---|---|---|---|
| 3,802,530 | 4/1974 | Purcell et al. | 296/190 X |
| 3,950,894 | 4/1976 | DiMaio | 49/501 |
| 4,738,482 | 4/1988 | Bohm et al. | 49/501 X |
| 4,993,775 | 2/1991 | Keys | 296/201 |
| 5,000,990 | 3/1991 | Freeman | 296/901 X |

FOREIGN PATENT DOCUMENTS 0076924  4/1983  European Pat. Off. ............ 296/201
2614082 10/1977  Fed. Rep. of Germany ........ 49/501
  64135  5/1968  German Democratic Rep. ... 49/501

OTHER PUBLICATIONS

Deere & Company brochure entitled "310C".

Primary Examiner—Dennis H. Pedder

[57] ABSTRACT

A backhoe loader includes a tractor-type vehicle with an operator station enclosed in a cab. Access to the cab is provided through a pair of front doors that are respectively disposed on opposite sides of the tractor hood, the upper portion of the doors also forming the front windshield of the cab. The major portion of the doors is formed by curved window glass, and each door includes a rigid metal frame that substantially conforms to the door opening. The door is made by placing the metal frame in a mold and encapsulating the frame in a polyurethane material that is molded around the metal frame by a reaction injection molding process. The door hinges and the latching mechanism are attached to the metal frame, while the molded polyurethane supports the window glass.

1 Claim, 4 Drawing Sheets

VEHICLE CAB DOOR CONSTRUCTION

BACKGROUND OF THE INVENTION

This invention relates to a cab for a working vehicle, such as a backhoe loader, and more particularly to an improved construction and method of manufacturing the access doors for such cabs.

A backhoe loader conventionally includes a tractor-type vehicle that supports and powers a front loader mechanism and a rearward backhoe. The operator station for the vehicle is positioned between the rear wheels and behind the tractor hood and conventionally includes a reversible seat that allows the operator to face forwardly during transport of the machine or when the loader is being operated or rearwardly when the backhoe is being operated. A substantial number of such machines are provided with a cab that encloses the operator station and permits the operator's environment to be controlled and also provides rollover protection for the operator. Such cabs are conventionally provided with one or more access doors.

In cabs of the above general type previously marketed by the assignee of the present invention, an access door has been provided in the front wall of the cab, providing ingress and egress from the cab in front of the left drive wheel and along the left side of the hood. The access door has been primarily constructed of curved window glass that forms a portion of the front windshield of the vehicle. Typically, the cabs for such vehicles are primarily made of glass to provide good 360° visibility from inside the cab, since such visibility is important not only during transport of the machine but while the machine is being operated. In the cabs of the above type, the doors have been constructed of fabricated steels components, with the windows being attached to the door by conventional flexible moldings. However, such doors have been expensive to manufacture because of the many welded details, which also adversely affects the aesthetics. Also, the dimensions on such doors have been difficult to control because of warpage and accumulation of piece part tolerances.

SUMMARY OF THE INVENTION

According to the present invention, there is provided an improved construction and method of manufacturing cab doors of the above general type. More specifically, the cab doors are fabricated from a steel frame that essentially extends around the outer periphery of the door. The frame is then inserted into a reaction injection mold and is encapsulated in a plastic material using a reaction injection molding process wherein two different material are injected into the mold and react to form a finished polymer.

An important feature of the invention resides in the provision of mounting means on the metal door frame for connection of the metal frame to the door hinges and to the latching mechanism, so that the stress applied through the hinges and the latching mechanism is applied to the metal frame rather than the more fragile plastic. The encapsulated steel frame also improves the dimensional stability of the door, so that the door has good sealing properties.

Another advantage of the invention resides in the fact that the window glass can be directly mounted onto the plastic casing.

Still another advantage of the invention resides in the fact that the plastic doors are dent and rust resistent as compared to a conventional welded steel door. Also, the plastic covering of the frame conceals the welds and sharp edges of the door frame to provide a more aesthetically pleasing door appearance.

DESCRIPTION OF THE PREFERRED EMBODIMENT

Figure 1:
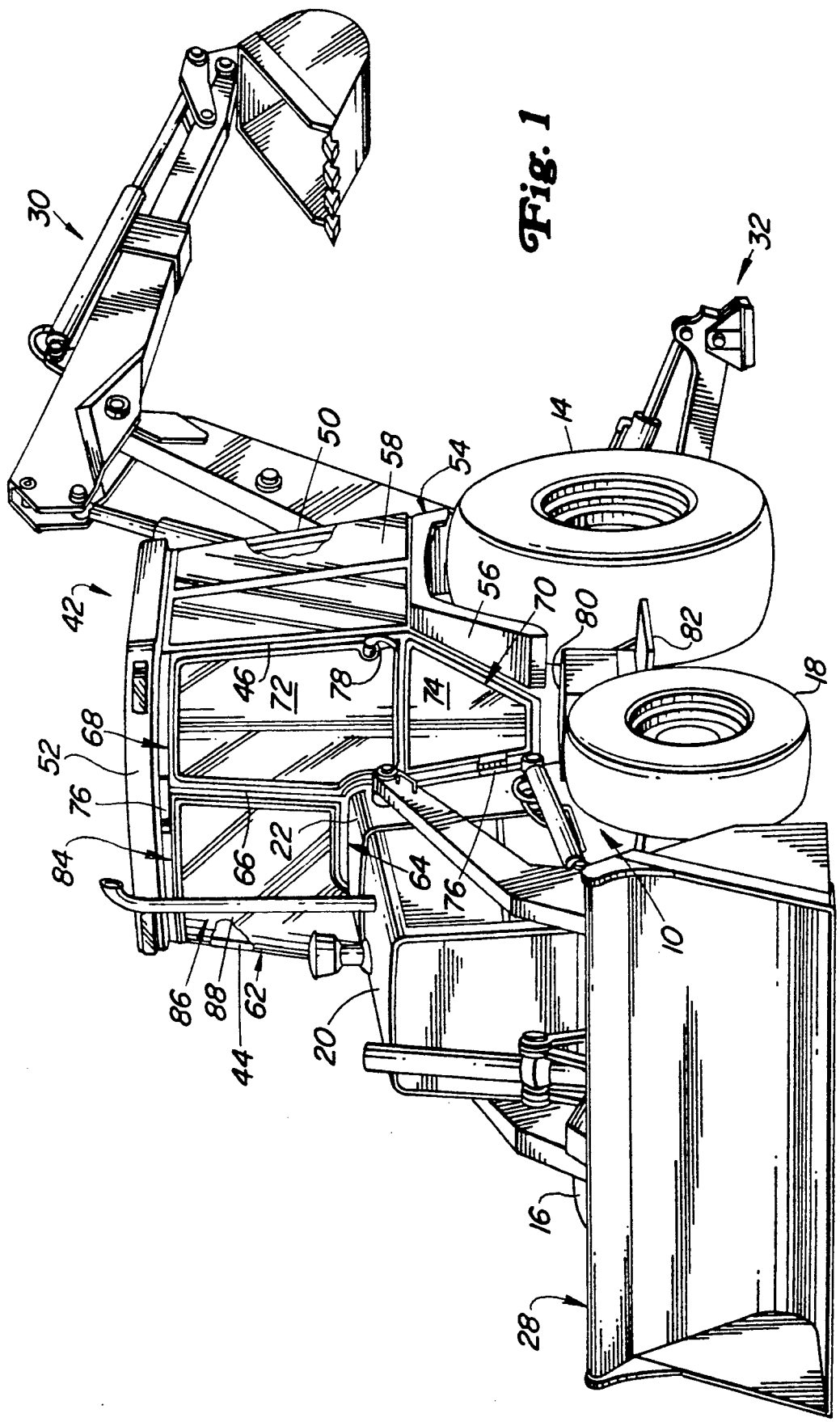
FIG. 1 is a left front perspective view of a backhoe loader having a cab with the improved cab door according to the present invention.
Figure 2:
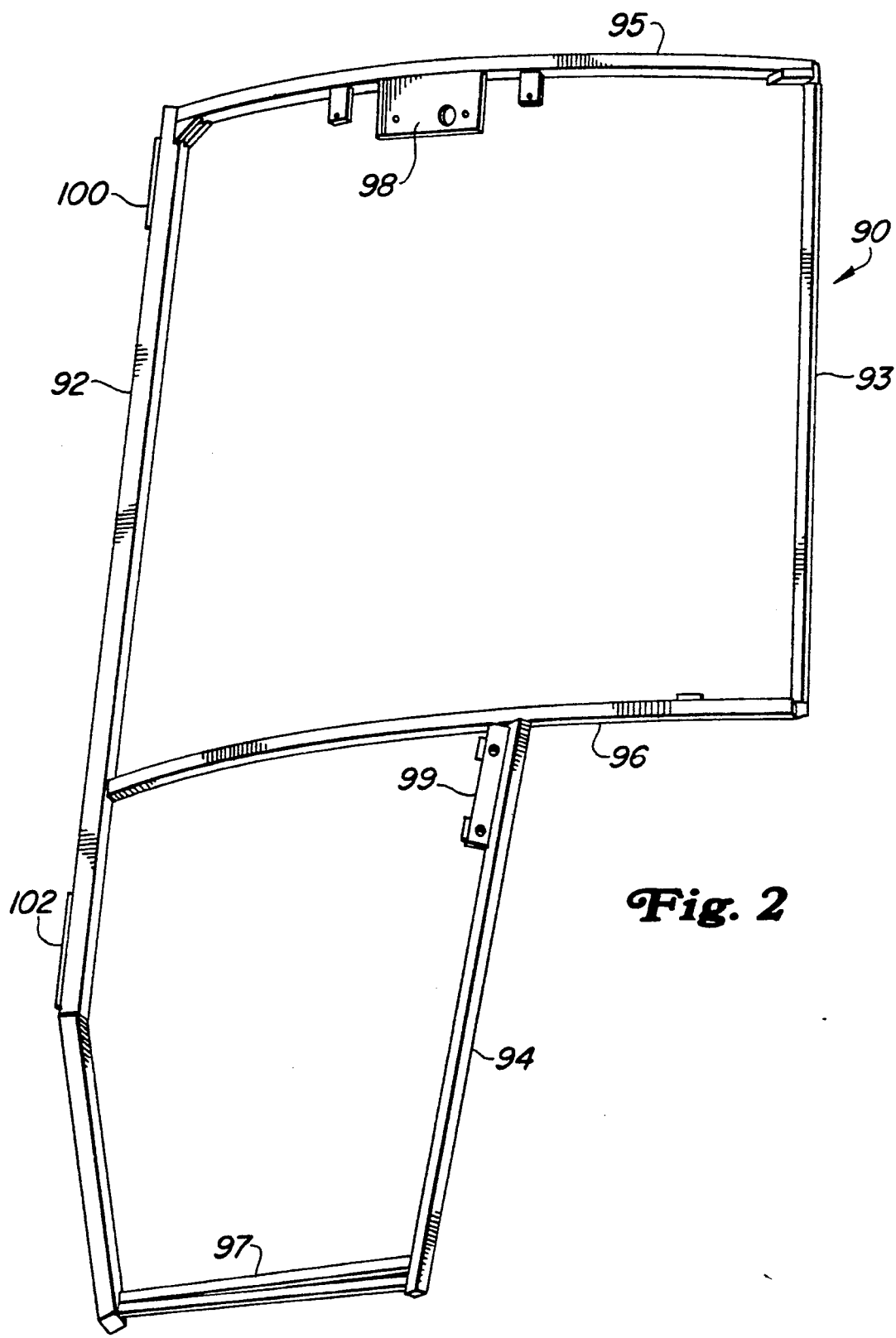
FIG. 2 is a perspective view of the steel frame of the door.
Figure 3:
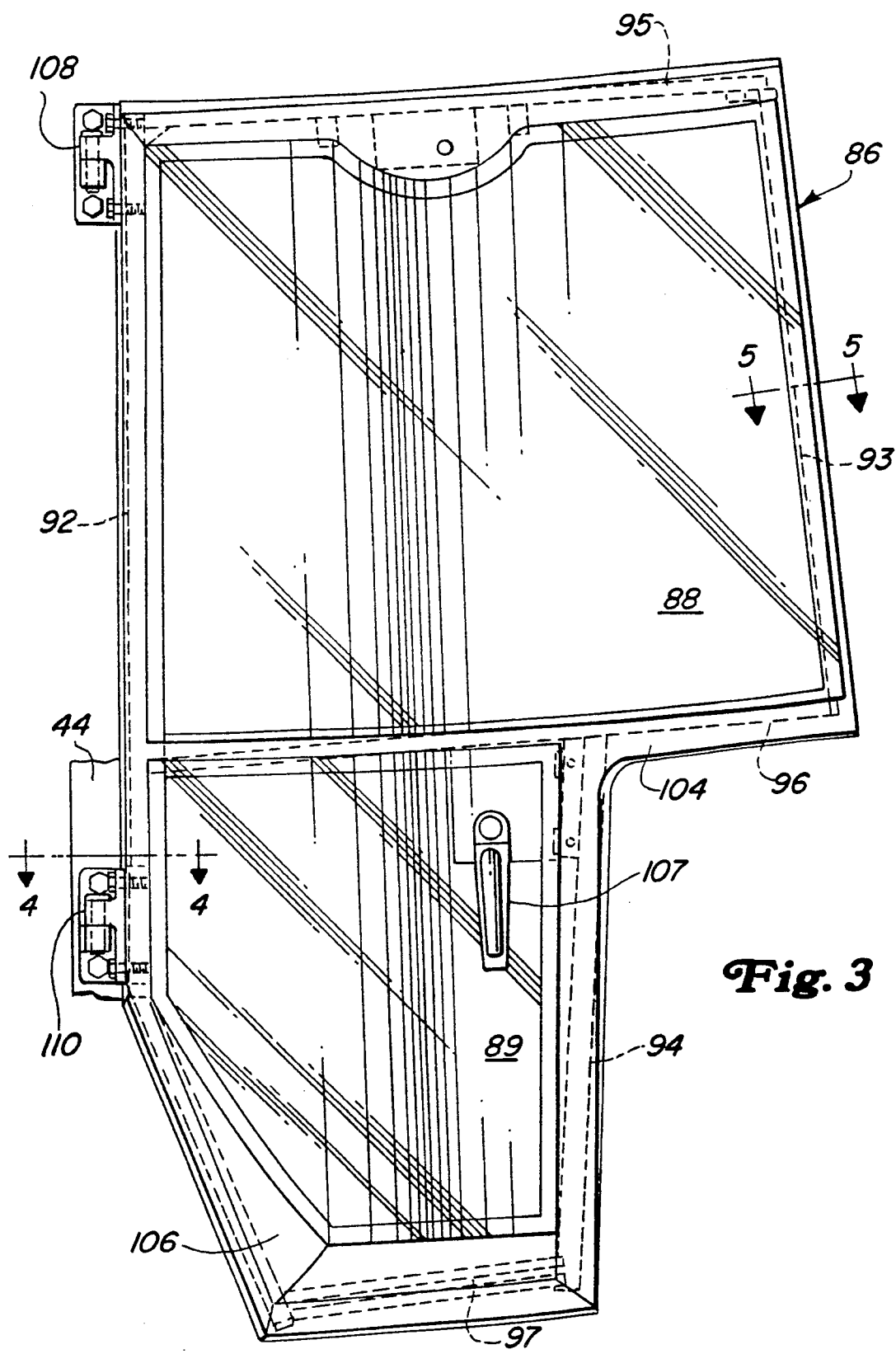
FIG. 3 is a view similar to FIG. 2 but showing the door frame encapsulated in the plastic material according to the invention, and with the windows mounted in the plastic material, the door being shown in an open condition.

The invention is embodied in a backhoe loader that includes a generally fore and aft main vehicle frame 10 supported on right and left rear drive wheels 14 and right and left steerable front wheels 16 and 18 through conventional axle structures that form a part of the main frame 10. As is well known in tractor construction in general and in backhoe loader construction in particular, the machine includes a fore and aft engine (not shown) mounted forwardly on the main frame and covered by a hood 20. A transmission is mounted on the main frame rearwardly of the engine and the rearwardly extending transmission output shaft drives the rear wheels through a differential and rearward drive axles, the differential and axle housings forming a part of the main frame.

A control console structure 22 has a generally inverted U-shaped configuration and is disposed at the rear end of the hood 20, and a steering wheel (not shown) extends rearwardly from the control console structure 22 on the centerline of the machine. As is well known, the engine axis and the transmission output axis are also located on the vehicle's centerline.

As is also well known, such machines are provided with a forward loader mechanism 28 that is connected to the main frame and a backhoe mechanism 30 that is also mounted on the main frame and extends rearwardly therefrom. Both the loader and backhoe mechanisms are of known construction and will not be described in detail. As is also conventional, a pair of stabilizers 32 are connected to the rear end of the main frame to stabilize the machine during operation of the backhoe.

Mounted on the main frame between the left and right rear wheels 12 and 14 and rearwardly of the control console structure 22 is an operator station that includes a horizontal floor and a seat mounted on the floor on the centerline of the machine. The seat is reversible and is positioned to face forwardly during operation of the loader or when the machine is in transport. Conventional brake and clutch pedals and transmission control levers are provided in front of the seat for access to the operator when the seat is facing forwardly as shown. Control levers for the backhoe are provided at the rear of the operator station for manipulation by the operator when the seat faces rearwardly.

The above operator station construction is well known and therefore not shown in the drawings.

The operator station is enclosed by a cab, indicated in its entirety by the numeral 42. The cab includes a cab frame that provides rollover protection for the operator, and the frame includes generally vertical right and left front posts 44 and 46 and generally vertical right and left rear posts 50, only the left rear post being shown in the drawing since the rear posts are similar. The posts support a cab roof 52 at their upper ends, and their lower ends are attached to the main frame 10 of the vehicle. The lower portions of the cab frame and attachment to the vehicle main frame is not shown in detail, since it is currently used on the commercially available machines produced by the assignee herein.

The cab includes opposite generally fore and aft side walls 54 that are identical, except that they are mirror images of one another, only the left side wall 54 being shown in FIG. 1. The side wall 54 includes a fender 56 that projects outwardly from the side wall and overlays the left rear wheel 14. The upper portion of the side wall 54 above the fender is formed by a pair of generally vertical side window panels 58. As is apparent, the upper portions of the front posts 44 and 46 are inclined slightly inwardly and rearwardly, while the upper portions of rear posts 50 are inclined slightly inwardly and forwardly, so that the walls of the cab are tapered upwardly. As is known, the side window panels 58 are swingable to an open position to provide ventilation for the cab. The cab is also provided with a generally upright rear wall (not shown) that is chiefly formed of glass panels that are swingable to an open position at the option of the operator.

The cab is also provided with a generally upright front wall, indicated in its entirely by the numeral 62. The front wall 62 has an inverted U-shaped frame member 64 that conforms with and receives the exterior of the control console structure 22. A generally upright mullion 66 in the front wall extends upwardly from the member 64 to the roof 52, and the mullion 66 is offset to the left of the vehicle's centerline, so that the operator has an unobstructed view directly to the front. The mullion 66 and the left edge of the member 64 form the right side of a front door opening 68, the top of the opening being formed by the roof 52, the bottom of the opening being formed by the operator station floor, while the left side of the opening is formed by the upper portion of the left front post 46 and the downwardly and forwardly inclined front portion of the fender 56. Mounted in and conforming to the opening 68 is a left door 70, that, with the exception of its outer framing, is chiefly formed by an upper glass panel 72 and a lower glass panel 74. The door is swingable on a pair of vertical hinge means 76, so that the door swings about its right-hand edge. The upper hinge means 76 is attached to the bottom of the roof adjacent the upper end of the mullion 66 and the lower hinge means 76 is attached to the side of the member 64. A latch 78 is provided at the left edge of the door to selectively lock the door to the left front post 46.

A right door opening 84 in the front wall is similarly formed by the mullion 66, the roof 52, the right front post 44, the right forward edge of the right fender 56, the floor and the right edge of the member 64. A right door 86 is mounted in the right door opening 84 and swings between its closed position, as shown in FIG. 1, and an open position about a pair of hinges 108 and 110 that connect the right edge of the door 86 to the right front post 44. Since the mullion 66 is offset from the vehicle's centerline 26, while the overall cab is centered on the centerline, the right door 86 is substantially wider than the left door 70, although, like the left door, the right door is chiefly formed of upper and lower glass panels 88 and 89. As is apparent, the entire front wall is arcuate in shape, with its concave side facing the operator seat, the curved upper glass panels 72 and 88 of the left and right doors respectively forming a curved windshield for the cab.

A landing area 80 is provided on the main frame 10 immediately in front of the left door opening 68 slightly below the level of the floor 36, and a step 82 is provided outwardly of and below the level of the landing area 80, so that the operator, when entering the cab, first steps on the step 82, the landing area 80 and then through the door opening onto the cab floor. A similar landing area is provided on the right side of the main frame immediately in front of the right door opening 84 to facilitate ingress and egress through the right door opening.

The construction of the left and right doors 70 and 86 are essentially the same, except that the right door is substantially wider, as noted above, and therefore only the construction of the right door 86 will be described in detail hereinafter. The method of manufacturing both doors is the same.

The door 86 includes a fabricated steel frame, indicated in its entirety by the numeral 90. The frame includes a right side member 92 that extends the height of the door, an upper left side member 93 and a lower left side member 94. A top member 95 extends between the upper ends of the right and left members 92 and 93, a center horizontal member 96 extends between an intermediate portion of the right member 92 and the lower end of the upper left member 93, and a bottom or lower member 97 connects the lower end of the right member 92 and the lower left member 94. The upper end of the lower left member 94 is connected to an intermediate portion of the center horizontal member 96. As is apparent, the lower end of the right member 92 is inclined inwardly, and the horizontal members 95 and 96 are arcuate in shape, with their concave sides facing rearwardly on the tractor. The frame members collectively outline the periphery of the door, with the exception of the center horizontal member 96 that divides the door into upper and lower portions, the narrower lower portion being offset from the upper portion to conform to the control console's structure. The upper left member 93 is disposed adjacent to and substantially conforms to the mullion 66.

A wiper mounting bracket 98 is attached to and depends from the top member 95, and a door handle or latch mounting bracket 99 is attached to the upper end of the lower left member 94. Upper and lower hinge brackets 100 and 102 are attached to the right side of the right member 92 at vertically spaced locations. Appropriate fasteners and mounting bores in the brackets 98, 99, 100 and 102 are provided for respectively connecting a windshield wiper assembly (not shown), a door latch 107, and the upper and lower door hinges 108 and 110 to the steel door frame 90.

The door frame 90 is encased in a polyurethane casing 104 that is molded around the door frame, the casing having substantially the same configuration as the door frame, except that it includes a lower panel 106 that encloses the lower portion of the frame 90. The casing is preferably made of polyurethane and is molded around the door frame using a reaction injection molding process wherein a polyol resin blend and an isocyanate material are simultaneously injected into a mold, wherein they react to form the finished polymer, in this case polyurethane.

Figure 4:
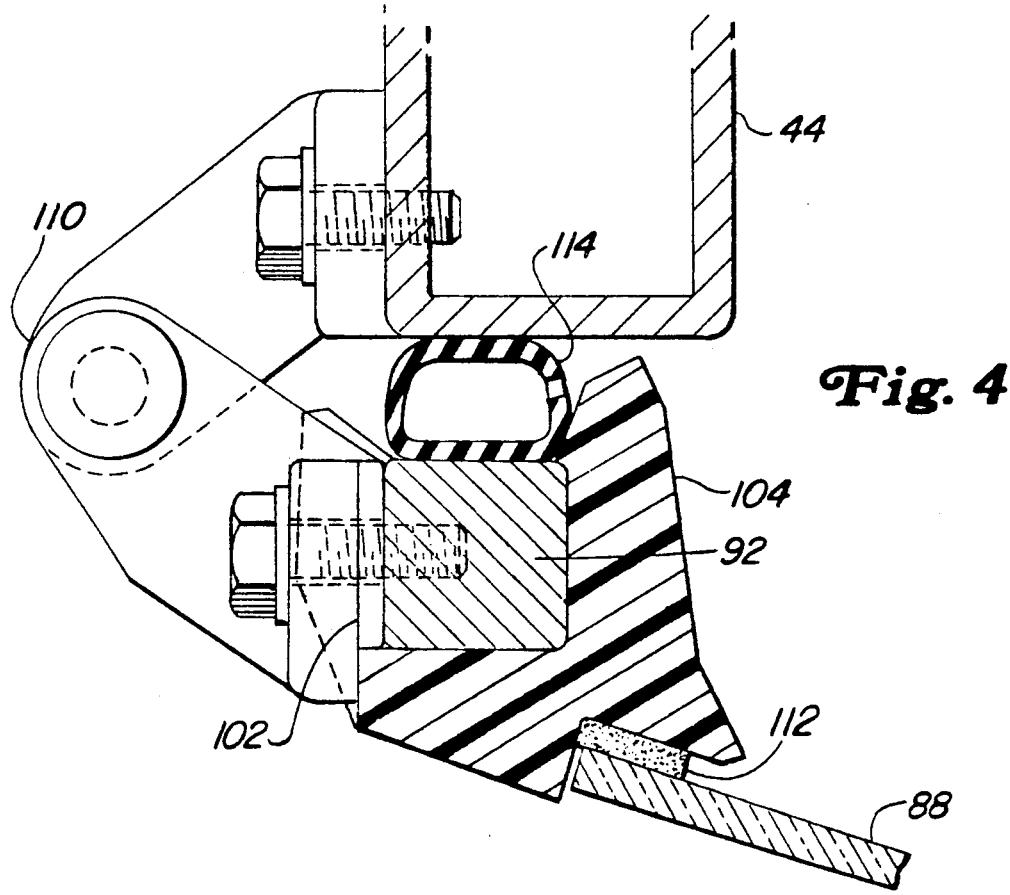
FIG. 4 is a section view along the lines 4—4 of FIG. 3 but showing the door in a closed position.
Figure 5:
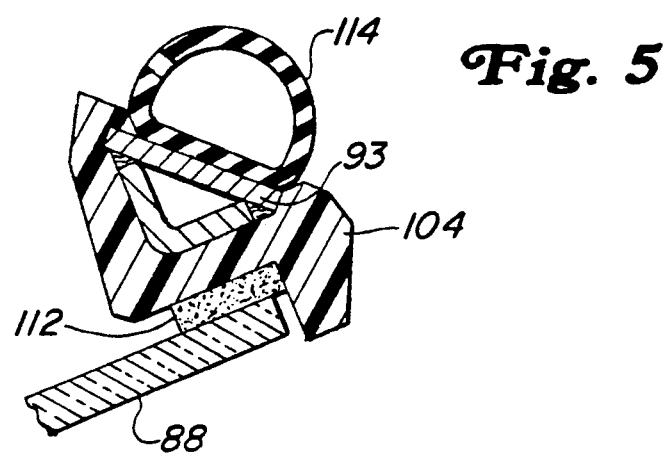
FIG. 5 is a section view along the lines 5—5 of FIG. 3.

After the polyurethane casing is molded around the steel door frame, the window panels 88 and 89 are mounted to the polyurethane casing using a conventional bonding element 112. However, the windshield wiper assembly, the door latch mechanism, and the hinges are attached directly to the steel door frame 90 by means of appropriate fasteners extending into the bores in the respective brackets 98, 99, 100 and 102. A door seal 114, formed by a tubular flexible member, is bonded to the inner or rear side of the periphery of the door frame 90 and seats against the cab frame to seal the door. As shown in FIGS. 4 and 5, the cross sections of the frame elements and the polyurethane casing are not uniform around the door, although the individual frame elements are generally uniform in cross section. The molded casing 104 can have any desired cross section, which is dictated by the function and aesthetics of the design.

As is apparent, the encapsulation of the frame within the polyurethane material provides a smooth exterior design that covers the welds and corners on the door frame to provide a door having a pleasing exterior appearance that resists rust and dents. The steel door frame moreover provides dimensional stability and strength to the door, and the loads imposed by the latch handles and hinges are carried by the steel frame rather than the weaker polyurethane casing. The steel frame also provides dimensional stability to the door, so that it maintains a better seal in the door opening.

We claim:

1. In a vehicle cab having a frame, including frame elements that at least partially define a door opening including a vertical element along one side of the opening and an upper horizontal element above the opening, an improved door for closing said door opening comprising:

a rigid metal door frame having a substantially open frame interior and first and second generally vertical side members;

a polyurethane casing molded around and substantially encapsulating the door frame and forming window opening means that comprises the major portion of the door;

transparent window means mounted in the window opening means; hinge means abutted to an outer surface of the first side member of the door frame at a discontinuity of the casing for swingably mounting the door in the opening; and latch means attached to the second side member of the door frame.

* * * * *